United States Patent [19]

Roberts

[11] 4,441,579

[45] Apr. 10, 1984

[54] TAIL-PIPE REPLACEMENT KIT

[75] Inventor: Peter Roberts, Mississauga, Canada

[73] Assignee: Thrush Incorporated, Rexdale, Canada

[21] Appl. No.: 371,230

[22] Filed: Apr. 23, 1982

[51] Int. Cl.³ ............................................. F01N 7/18
[52] U.S. Cl. .................................. 181/243; 180/309; 206/335
[58] Field of Search ...................... 181/227, 228, 243; 285/382.2; 16/110 R, 111 R, 110.5, 114 R, 124, 125; 190/57, 58 R, 58 A; 294/137, 149, 150, 151, 152, 165, 166; 206/335, 443; 180/311, 296, 309, 89.2

[56] References Cited

U.S. PATENT DOCUMENTS

| | | | |
|---|---|---|---|
| 2,160,808 | 6/1939 | Bradley | 181/243 X |
| 2,248,234 | 7/1941 | Hickman et al. | 294/137 |
| 2,858,853 | 11/1958 | Lyon | 181/228 |
| 3,263,772 | 8/1966 | Irwin et al. | 181/227 |
| 3,382,948 | 5/1968 | Walker et al. | 181/228 X |
| 4,055,287 | 10/1977 | Champenois, Jr. | 294/150 X |
| 4,279,326 | 7/1981 | Meineke et al. | 181/228 |

Primary Examiner—Benjamin R. Fuller
Attorney, Agent, or Firm—Swabey, Mitchell, Houle, Marcoux & Sher

[57] ABSTRACT

A tail pipe kit for automotive vehicle comprises a first arch section and a second spout section separate therefrom and connectible thereto. The two sections in kit form are secured together in overlapping relationship expediently using adhesive tape. Cardboard cheeks sandwich the bight of the arch to enclose therewith a space wherein hardware for the assemby of the kit is enclosed. The arch sections are conformed to fit within the spatial envelopes of a plurality of vehicles. It is found that some 25 different kits can service a market presently serviced by about 25 tail pipes formed as a unitary whole. The kits are easier to transport and easier to install in comparison to unitary tail pipes.

12 Claims, 4 Drawing Figures

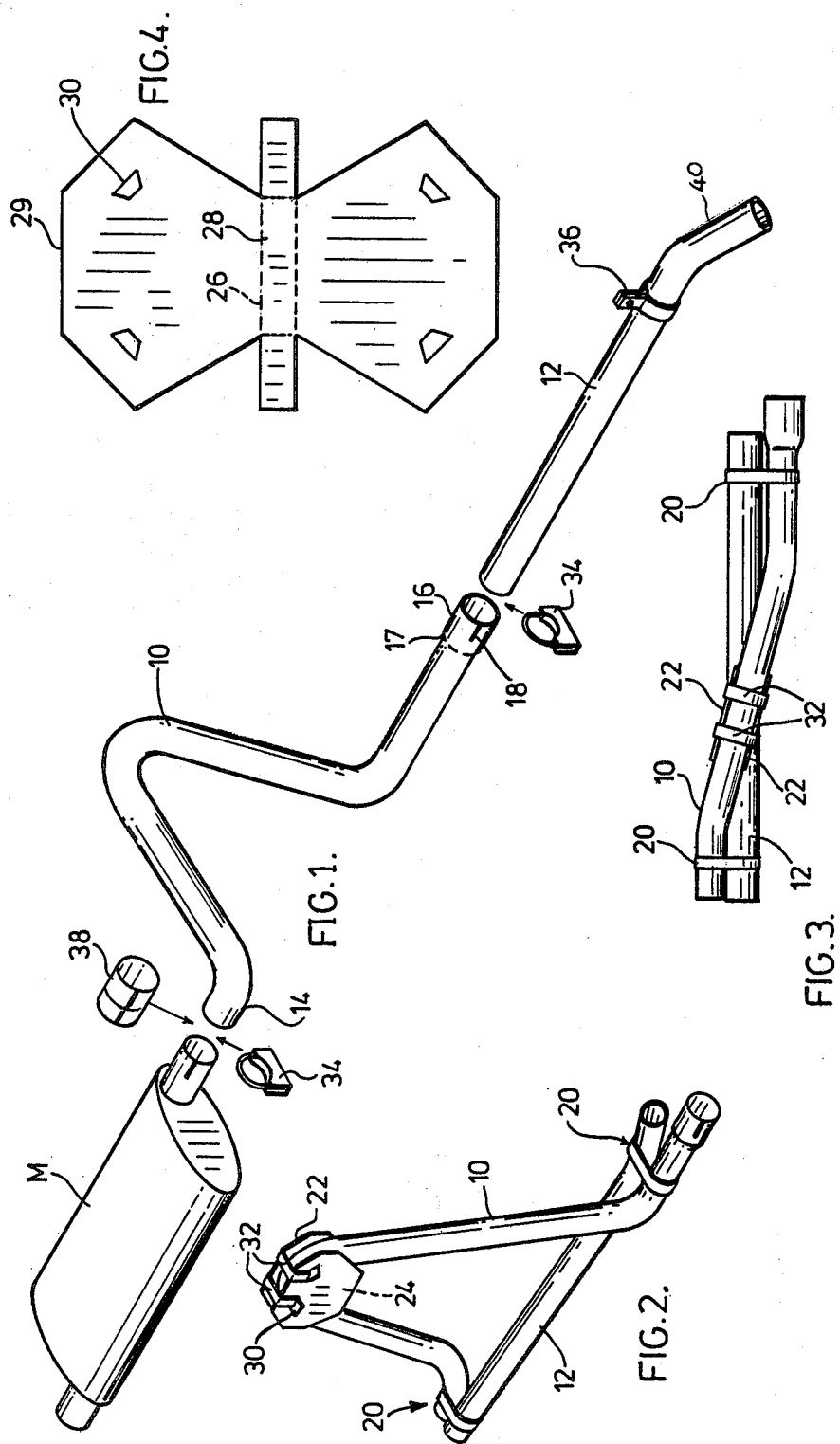

TAIL-PIPE REPLACEMENT KIT

FIELD OF INVENTION

This invention relates to automotive vehicles. It particularly relates to the provision of replacement exhaust components thereof, namely the tail pipe.

BACKGROUND OF INVENTION

An automobile exhaust systems comprise 3 main components, being the exhaust pipe, muffler and tail pipe. In rear wheel drive vehicles of conventional design the muffler usually locates forwardly of the rear axle of the vehicle, and the tail pipe connects to the muffler, arches over the rear axle and extends towards the rear extremity of the vehicle in an elongated spout portion. Some 80 percent of the total market of domestic automobiles and vans currently comprises so called "popular models" which individually enjoy sales significantly greater than those of other models. Of this 80%, or about 65% of the total, require no fewer than about 250 different tail pipe configurations to be stocked for servicing, necessitating resulting in relatively high costs or inventory, floor space and time for stocking and retrieval purposes.

The tail pipes are generally of some 5-7 ft (2.2-2.5 m) in length and pose significant difficulty for distribution, particularly by common carriers, where the length may be restricted to about 4-5 ft. Whilst the length of the tail pipes has not seriously inconvenienced trade at the professional installer level, that is to say in muffler shops, it has impeded distribution through mail-order, self-serve and do it yourself outlets. There is moreover a further impediment to this portion of the trade, due to the difficulty in fitting tail pipes of normal length to an automotive vehicle, this generally necessitating the vehicle being hoisted to provide a ground clearance between the ground and frame of the vehicle appreciably greater than can be obtained using normal bumper jacks or ramps.

BRIEF DESCRIPTION OF THE INVENTION

I have found that many of the aforedescribed disadvantages may be overcome by a relatively simple expedient, such that the approximately 65% of popular automotive vehicles may be served with a mere 25replacement tail pipe units rather than 250 spoken of. The replacement units of the invention are shorter than conventional units and therefore easier to transport and install.

In accordance with one aspect of my invention, a replacement tail pipe kit for automotive vehicles comprises a first, tubular arched section and a second tubular spout section, the two sections being physically separate but connectible together in gas flow relationship. Preferably the trailing end of the arched section, that is the end thereof that will point towards the rear of the vehicle when the section is installed, is expanded to form a socket for receiving therein the spout section in its gas flow relationship. The two sections are formed so as to be of axially similar lengths so as to facilitate transportation of the kit, the actual lengths not normally being critical, and are connected together in overlapping relationship by temporary means, adhesive strapping being suitable for its convenience and strength, particularly when reinforced. A pair of opposed cheeks are temporarily secured to the arched section in the bight portion thereof so as to sandwich that portion therebetween and form therewith an enclosed space, the kit further comprising hardware such as clamps, hangers and pipe reducers packaged within said enclosed space.

The cheeks may be conveniently formed as a unitary structure by folding from cardboard being preferably interconnected at their proximal ends by a base section. The material of construction of the cheeks is not critical, corrugated cardboard being presently preferred because of its relative strength and cheapness. Preferably the cheeks are provided adjacent their distal margin with one or more cut outs serving both as a handhold for the kit and permitting the passage of adhesive strapping therethrough with which to secure the cheeks and the arched section together temporarily, as mentioned above.

In accordance with another aspect of my invention, a method for manufacturing a tail pipe kit suitable for use with a plurality of different vehicles comprises identifying a plurality of vehicles having overlapping spatial envelopes in at least the rear axle section of the vehicles, conforming a tubular arched tail pipe section of limited axial extent common to the spatial envelopes, and providing a separate tubular spout section connectible to said arched section in gas flow relationship, the separate spout section having an axial length at least suitable for the largest of the plurality of vehicles.

By spatial envelope is meant the path taken by the arched section of a tail pipe manufactured in accordance with OEM standard for a vehicle, and the free space surrounding the path when the tail pipe is installed on the vehicle in accordance with OEM standards, the normal operational requirements of the vehicle being taken into consideration, which is to say that due allowance must be made for relative movement between the sprung and unsprung components of the vehicle. Generally speaking it is found that certain models of a particular manufacturer may be related, having overlapping spatial envelopes due to the use of common components and modular construction techniques.

Preferably the vehicles of the group will also have overlapping spatial envelopes in the tail pipe spout section of the vehicles, that is to say portions of the vehicle generally rearwardly of the rear axle section, although it will be appreciated that the routing of the tail pipe spout sections is not critical in the sense that the vehicle components in the section are normally all sprung, and there is thus no relative movement between sprung and unsprung components to be allowed for as in the arched section. Generally speaking I find that it is possible to provide a spout section which is linear in at least forwardly directed portions thereof, which is particularly advantageous in that the axial length of the spout section may be adjusted by the installer simply with a hacksaw in accordance with the length of the vehicle and/or whether or not it is desired to incorporate into the silencing system a resonator.

Having described the broad features of my invention specific embodiments thereof will be further discussed from which the general aims, objects and advantages of the invention will become more apparent.

BRIEF DESCRIPTION OF THE DRAWINGS

FIG. 1: shows in schematic form part of a silencing system for an automotive vehicle including a tail pipe in accordance with the invention;

FIG. 2: shows in schematic form, in side elevation a tail pipe in packaged kit form in accordance with the invention;

FIG. 3: is as FIG. 2 seen from above, and FIG. 4: shows in flat opened out form a package forming part of the kit.

DESCRIPTION OF THE PREFERRED EMBODIMENT

Referring now to the drawings in detail, a partial exhaust system for an automotive vehicle comprises a muffler M and separate tail pipe sections comprising arched section 10 and spout section 12. In the prior art it is usual to manufacture tail pipe sections 10 and 12 as an integral, unitary part. Arched section 10 has an inlet end 14 and outlet end 16, the latter generally being expanded at 17 so as to receive in telescoping relationship between an end of spout section 12. End 16 may further be slit, as at 18 as is generally known in the art, whereby the tube end may be more readily constricted tightly about the inserted spout end.

The axial lengths of arched section 10 and spout section 12 are desirably approximately equal, and are thus limited in extent in comparison to a one-piece tail pipe of the prior art. For assembly into a kit form, arched section 10 and spout section 12 are located in overlapping relationship, and are temporarily secured together by adhesive tape 20. A pair of cheeks 22 sandwich the bight of arched section 10 therebetween so as to form therewith an enclosed space 24. Cheeks 22 are expediently formed in the manner shown in FIG. 4 by folding along lines 26 from corrugated cardboard stock to be upstanding from a base 28, the base being dimensioned to fit between the legs of arched section 10 when the distal edges 29 of cheeks 22 are flush with the upper, outer surface of the bight. Cheeks 22 are each provided with one or more cut outs 30 spaced inwardly from distal edges 29 by about the diameter of the tube forming arched section 10 to serve as hand or finger holds, and also to permit a loop of adhesive tape 32 to pass therethrough so as to secure cheeks 22 in sandwiched relation to arched section 10. Various hardware items such as pipe clamps 34, hangers 36 and connectors 38 also comprise part of the kit of parts, and are packaged within confined space 24, together with installation instructions if desired.

Considering now the desired conformation of arched section 10, this is conveniently determined by an iterative process. Thus the arch sections of tail pipes manufactured to OEM specifications for a family of vehicles having, or suspected of having overlapping spatial envelopes are compared visually, and the pair having the closest match selected. A first trial arch section having a routing common to the first pair is made up and compared to the spatial envelopes of the first pair of vehicles. If a satisfactory fit is obtained, the first trial arch section is combined with the next closest matching arch section to form a second trail arch section, and so on. Certain modifications to the trial arch sections may be suggested where particular vehicles are unduly demanding in their spatial envelopes, or conversely where they are not unduly demanding. In the above spoken combination process it is often found that two or more OEM tail pipes differ in their arch sections by so small a degree as to not warrant any modifications thereof to a common routing, in which instance one of the OEM arches will of course, serve as the trial arch section.

As earlier observed it is generally found that the spatial envelope for the spout section 12 of a group of vehicles is such as to permit the spout section to be essentially linear; it may be preferred both for cosmetic reasons and also in some instances to provide for bumper clearance to downturn the free end of spout section 12 slightly, as at 40. The length of a generally linear spout section 12 is not critical and the length of such section in any kit will be equal to the longest spout section required for all vehicles of that group. Shorter spout sections for vehicles of the group are user prepared simply with a hack saw or the like; it will be appreciated that socket 16 provided for coupling the arch section and the spout section is formed on the arch section, the axial length of which does not need to be adjusted. The position of an essentially linear spout section 12 facilitates greatly the interruption of the spout section for the fitting of a resonator (not illustrated).

I claim:

1. A replacement tail pipe kit suitable for use with either a first vehicle that was originally equipped with a first tubular tailpipe having an inlet end connected to a muffler, an arched region of predetermined first configuration adjacent the inlet end, and an outlet end spaced apart from the inlet end by a first distance, or a second vehicle that was originally equipped with a second tubular tail pipe having an inlet end connected to a muffler, an arched region of predetermined second configuration adjacent the inlet end, and an outlet end spaced apart from the inlet end by a second distance, said kit comprising:

a first tubular section having an inlet end for connection to a muffler, an intermediate portion having an arch conforming to the overlapping spatial envelopes of both the first and second configurations, and an outlet end spaced apart from said inlet end by a third distance;

a second tubular section having an inlet end and an outlet end spaced apart from the inlet end by a fourth distance, the fourth distance being approximately the same as the third distance and the sum of the third and fourth distances being at least as long as the larger of the first and second distances;

means temporarily attaching the first and second tubular sections in overlapping relationship to provide a shipping package substantially shorter than either of said first and second distances; and means permitting said outlet end of said first tubular section to be operatively connected to said inlet end of said second tubular section in gas flow relationship when said replacement tail pipe kit is being permanently installed in one of said first and second vehicles.

2. A kit for replacing an OEM tail pipe in an automotive vehicle, the OEM tail pipe being unitary and having a predetermined length, comprising:

a tubular arched section having an inlet end, an intermediate portion having an arch of predetermined configuration, and an outlet end;

a tubular spout section separate from said tubular arched section and having an inlet end and an outlet end, the spout section being approximately as long as the arched section;

means temporarily joining said inlet and outlet ends of said tubular arched section to said tubular spout section thus joining said tubular sections in overlapping relationship in an assembly approximately half as long as the tail pipe replaced; and means permitting said outlet end of said tubular arched section to be operatively connected to said inlet end of said tubular spout section in gas flow relationship when said replacement tail pipe kit is being installed.

3. A replacement tail pipe kit as in claim 2, wherein said means permitting said outlet end of said tubular arched section to be operatively connected to said inlet end of said tubular spout section comprises a telescopic mounting for said outlet end of said tubular section and said inlet end of said tubular section.

4. A replacement tail pipe kit as in claim 2, wherein said means permitting said outlet end of said tubular arched section to be operatively connected to said inlet end of said tubular spout section comprises said outlet end of said tubular arched section being expanded in diameter while said inlet end of said tubular spout section being of the same diameter as the remaining portions thereof, thus permitting said inlet end of said tubular spout section to be telescopically connected to said outlet end of said tubular arched section, while also permitting said tubular spout section to be cut in the vicinity of said inlet end thereof when a shorter length is desired.

5. A replacement tail pipe kit as in claim 4, wherein said outlet end of said tubular arched section includes a slit permitting said outlet end of said tubular arched section to be more readily constricted so as to tighten same about said inlet end of said tubular spout section.

6. A replacement tail pipe kit as in claim 4, further comprising a clamp for surrounding said outlet end of said tubular arched section for tightening same about said inlet end of said tubular spout section.

7. A replacement tail pipe kit as in claim 2, wherein said means temporarily joining said inlet and outlet ends of said tubular arched section to said tubular spout section comprises a first tape bound around and joining said inlet end of said tubular arched section and said inlet end of said tubular spout section and a second tape bound around said tubular sections in the vicinity of said outlet ends thereof.

8. A replacement tail pipe kit as in claim 2, further comprising hardware for connecting said tail pipe kit to the automotive vehicle, and means packaging said hardware with said tubular arch and spout sections.

9. A replacement tail pipe kit as in claim 8, wherein said means packaging said hardware with said tubular arched and spout sections comprises a pair of opposed cheeks temporarily secured to said tubular arched section to sandwich the bight of said arch of said intermediate portion therebetween so as to form an enclosed space therebetween.

10. A replacement tail pipe kit as in claim 9, wherein said means packaging said hardware further comprises a base connecting said opposed cheeks, said cheeks and base being unitarily folded from cardboard.

11. A replacement tail pipe kit as in claim 10, wherein said opposed cheeks are provided with one or more cut-outs adjacent the upper margin thereof to serve as handholds.

12. An improved replacement tail pipe of the type wherein an elongated tubular element is provided with an inlet end for connection to the muffler of a vehicle, an outlet end for exhausting fumes into the atmosphere, and an intermediate region between the inlet and outlet ends for extending over the rear axle of the vehicle through a passage of predetermined minimum configuration above the rear axle, wherein the improvement comprises:

kit means for replacing the tail pipe of either of said vehicle and another vehicle that was originally equipped with a tail pipe having a different length from inlet to outlet ends and having an intermediate region configured to extend through a passage having a different predetermined minimum configuration above the rear axle, said kit means including:

a tubular element have a first end for connection to the muffler of either of said vehicle and another vehicle, an arched region for extending over the rear axle of either of said vehicle and another vehicle, and a second end adjacent the arched region, and manually shortenable tubular means for cooperating with the second end of the tubular element to complete a tail pipe for either of said vehicle and another vehicle, said tubular means being elongated and having a length at least as great as the difference between the tubular element and the longer of the tail pipes with which said vehicle and another vehicle were originally equipped.

* * * * *

UNITED STATES PATENT AND TRADEMARK OFFICE
CERTIFICATE OF CORRECTION

PATENT NO. : 4,441,579
DATED : April 10, 1984
INVENTOR(S) : Peter Roberts

It is certified that error appears in the above-identified patent and that said Letters Patent is hereby corrected as shown below:

Front Page, [73] Assignee, after "Rexdale," insert --Ontario,--;

Front Page, [57] ABSTRACT, line 11, "25 tail pipes" should be --250 tail pipes--.

Column 1, line 11, "systems comprise" should be --system which comprises--;

Column 1, line 23, delete "necessitating".

Signed and Sealed this

Nineteenth Day of March 1985

[SEAL]

Attest:

DONALD J. QUIGG

Attesting Officer

Acting Commissioner of Patents and Trademarks